(12) United States Patent
Matsuda et al.

(10) Patent No.: US 11,014,408 B2
(45) Date of Patent: May 25, 2021

(54) PNEUMATIC TIRE (71) Applicant: The Yokohama Rubber Co., LTD., Tokyo (JP)

(72) Inventors: Jun Matsuda, Hiratsuka (JP); Yuji Satoh, Hiratsuka (JP); Yuji Kodama, Hiratsuka (JP)

(73) Assignee: The Yokohama Rubber Co., LTD.

( * ) Notice: Subject to any disclaimer, the term of this patent is extended or adjusted under 35 U.S.C. 154(b) by 191 days.

(21) Appl. No.: 16/300,924

(22) PCT Filed: May 12, 2017

(86) PCT No.: PCT/JP2017/018048
§ 371 (c)(1),
(2) Date: Nov. 12, 2018

(87) PCT Pub. No.: WO2017/195890
PCT Pub. Date: Nov. 16, 2017

(65) Prior Publication Data
US 2019/0160873 A1 May 30, 2019

(30) Foreign Application Priority Data
May 12, 2016 (JP) .............................. JP2016-095766

(51) Int. Cl.
*B60C 9/18* (2006.01)
*B60C 9/07* (2006.01)
(Continued)

(52) U.S. Cl.
CPC ................. *B60C 9/18* (2013.01); *B60C 9/02* (2013.01); *B60C 9/07* (2013.01); *B60C 9/08* (2013.01);
(Continued)

(58) Field of Classification Search
CPC .... B60C 9/18; B60C 9/07; B60C 9/08; B60C 9/09; B60C 9/17; B60C 2009/2012; B60C 2009/2016; B60C 2009/2247
See application file for complete search history.

(56) References Cited

U.S. PATENT DOCUMENTS 3,580,318 A * 5/1971 Menell ...................... B60C 9/28
152/526
6,267,166 B1 * 7/2001 Secondari ................. B60C 9/17
152/455
(Continued)

FOREIGN PATENT DOCUMENTS

JP H04-297304 10/1992
JP H09-095106 4/1997
(Continued)

OTHER PUBLICATIONS

International Search Report for International Application No. PCT/JP2017/018048 dated Jul. 18, 2017, 4 pages, Japan.

*Primary Examiner* — Jacob T Minskey
*Assistant Examiner* — Virak Nguon
(74) *Attorney, Agent, or Firm* — Thorpe North & Western (57) ABSTRACT

Provided is a pneumatic tire. One terminal of a carcass layer extends to a ground contact edge of a tread portion positioned on an opposite side with respect to a tire center line as a reference. The carcass layer has a double layer structure including an inner layer positioned inward in a tire radial direction in a tread region and an outer layer positioned outward in the tire radial direction of the inner layer in the tread region. A cord angle in the carcass layer in a tread central region with respect to a tire circumferential direction is different from a cord angle in at least one of the inner layer and the outer layer of the carcass layer in a side region with respect to the tire circumferential direction.

20 Claims, 6 Drawing Sheets (51) Int. Cl.
- *B60C 9/09* (2006.01)
- *B60C 9/17* (2006.01)
- *B60C 9/02* (2006.01)
- *B60C 9/08* (2006.01)
- *B60C 13/02* (2006.01)

(52) U.S. Cl.
CPC ............... *B60C 9/09* (2013.01); *B60C 9/17* (2013.01); *B60C 13/02* (2013.01)

(56) References Cited

U.S. PATENT DOCUMENTS

| | | | |
|---|---|---|---|
| 2011/0030871 A1* | 2/2011 | Bestgen | ............... B60C 9/2009 |
| | | | 152/548 |
| 2014/0124117 A1* | 5/2014 | Urata | ................... B60C 9/06 |
| | | | 152/535 |
| 2015/0298510 A1* | 10/2015 | Shimizu | ............. B60C 15/0027 |
| | | | 152/541 |

FOREIGN PATENT DOCUMENTS

| | | |
|---|---|---|
| JP | 2000-043505 | 2/2000 |
| JP | 2002-127711 | 5/2002 |
| JP | 2002127711 A * | 5/2002 |
| JP | 2005-022537 | 1/2005 |
| JP | 2006-256522 | 9/2006 |
| JP | 2007-191044 | 8/2007 |
| JP | 2008-126841 | 6/2008 |
| WO | WO 2012/161331 | 11/2012 |

\* cited by examiner

PNEUMATIC TIRE

TECHNICAL FIELD

The present technology relates to a pneumatic tire, and more particularly relates to a pneumatic tire, which is reduced in weight and is capable of securing rigidity desired for each of a tread region and side regions by employing a curved carcass structure in which an angle of a carcass cord continuously changes in the tread region and the side regions.

BACKGROUND ART

Generally, as a method of reducing weight of a tire, the thickness is reduced of rubber used for, for example, a cap tread and sides, which are portions of the tire large in area. However, from the perspective of wear resistance and durability, it is difficult to achieve further reduction in weight with the method of reducing the thickness of each portion of the tire.

Meanwhile, for reduction in weight of the tire, there have been proposed various types of a tire which does not require an independent belt layer of a related-art radial structure. For example, in Japan Unexamined Patent Publication No. 2005-22537, the following pneumatic tire can be obtained. That is, in each of an inner side cord layer and an outer side cord layer, a large number of cords are arrayed in parallel with each other. A cord angle in each cord layer is set to a range from 80° to 90° in sidewall portions and to a range from 15° to 50° in a center of a tread portion, and the cords are tilted reversely with each other between both the cords layers. As a result, the pneumatic tire can have both an internal-pressure retaining function and a hoop function without a belt layer. However, the related art relates to a complicated manufacturing method in which one cord continuously reciprocates between right and left bead cores, and hence practical utility is not high.

Further, in Japan Unexamined Patent Publication No. 2002-127711, the following pneumatic tire can be obtained. That is, the pneumatic tire includes two or more carcass layers for reinforcing a space between a pair of beads. Cords of the carcass layers are arranged substantially in a tire radial direction from the bead to a position near a tire maximum width position. From this position to a ground contact edge, an angle of the cords with respect to a circumferential direction gradually changes. With respect to the circumferential direction, the cords are arranged at an angle from 20° to 60° in the vicinity of the ground contact edge, and are arranged at an angle from 20° to 50° at a tread portion. However, in the case where reinforcement is performed through use of the two or more carcass layers, as compared to a case where a single carcass layer is used, portions such as end portions of the carcass layers, which are wound about the bead cores, do not substantially function as reinforcing materials. Thus, there is a problem in that effective reinforcement cannot be performed while reducing the tire in weight.

SUMMARY

The present technology provides a pneumatic tire, which is reduced in weight and is capable of securing rigidity desired for each of a tread region and side regions by employing a curved carcass structure in which an angle of a carcass cord continuously changes in the tread region and the side regions.

An embodiment of the present technology is a pneumatic tire including a tread portion, a pair of sidewall portions, a pair of bead portions, and a carcass layer. The tread portion extends in a tire circumferential direction and has an annular shape. The pair of sidewall portions are arranged on both sides of the tread portion. The pair of bead portions are arranged inward in a tire radial direction of the pair of sidewall portions. The carcass layer includes a plurality of carcass cords, which are mounted between the pair of bead portions, and are wound from a tire inner side to an outer side about bead cores of the pair of bead portions. When a tread region indicates a region corresponding to a ground contact width of the tread portion, a tread central region indicates a region corresponding to 80% of a center of the ground contact width of the tread portion, and a side region indicates a region inward in the tire radial direction with respect to a tire maximum width position, one terminal of the carcass layer extends to a ground contact edge of the tread portion positioned on an opposite side with respect to a tire center line as a reference. The carcass layer has a double layer structure including an inner layer positioned inward in the tire radial direction in the tread region and an outer layer positioned outward in the tire radial direction of the inner layer in the tread region. A cord angle in the carcass layer in the tread central region with respect to the tire circumferential direction is different from a cord angle in at least one of the inner layer and the outer layer of the carcass layer in the side region with respect to the tire circumferential direction.

The present technology has the following structure. That is, the one terminal of the carcass layer extends to the ground contact edge of the tread portion positioned on the opposite side with respect to the tire center line as the reference. The carcass layer has a double layer structure including the inner layer positioned inward in the tire radial direction in the tread region and the outer layer positioned outward in the tire radial direction of the inner layer in the tread region. The cord angle in the carcass layer in the tread central region with respect to the tire circumferential direction is different from the cord angle in at least one of the inner layer and the outer layer of the carcass layer in the side region with respect to the tire circumferential direction. Thus, rigidity different for each of the tread region and the side region can be achieved, and the rigidity desired for each of the tread region and the side region can be secured. Further, as compared to the related-art pneumatic tire including the plurality of belt layers, the tire can be reduced in weight. Further, as compared to the pneumatic tire including the carcass layers, which are not single but have two or more layers, portions which do not substantially function as reinforcing materials can be reduced, and hence the space between the bead portions can be reinforced with the minimum members.

In the present technology, it is preferred that a separation distance between the one terminal and another terminal of the carcass layer be set to 5 mm or larger. Thus, the durability of the terminals of the carcass layer including the inner layer and the outer layer can be improved.

In the present technology, it is preferred that the cord angle in the carcass layer in the tread central region with respect to the tire circumferential direction be smaller than the cord angle in at least one of the inner layer and the outer layer of the carcass layer in the side region with respect to the tire circumferential direction. Thus, the carcass layer can share the function as the belt layer.

In the present technology, it is preferred that the cord angle in at least one of the inner layer and the outer layer of the carcass layer with respect to the tire circumferential direction fall within a range from 10° to 75° in the tread central region, and that the cord angle in the carcass layer with respect to the tire circumferential direction fall within a range from 85° to 90° in the side region. Thus, the carcass layer can sufficiently share the function as the belt layer. Further, near a boundary between the tread region and the side region, the carcass cords are allowed to be gently changed in angle, and hence the durability can be improved. More preferably, the cord angle preferably falls within a range from 15° to 70° and more preferably a range from 15° to 65° in the tread central region.

In the present technology, it is preferred that a cord count per unit width, which is 50 mm, for the plurality of carcass cords forming the carcass layer at least in the tread region be from twenty to seventy, and that a diameter of each of the plurality of carcass cords fall within a range from 0.2 mm to 1.5 mm. Thus, increase in mass of the carcass layer is suppressed, which contributes to reduction in weight of the tire. At the same time, degradation in rigidity and durability can be suppressed.

In the present technology, it is preferred that the belt layer be provided on an outer circumferential side of the carcass layer in the tread region. As a result, the rigidity of the tread portion can sufficiently be secured, and satisfactory steering stability can be exerted.

In the present technology, it is preferred that the belt layer be a single layer. Thus, increase in mass of the belt layer can be suppressed to a minimum extent, and the hoop effect of the tread portion can be increased.

In the present technology, it is preferred that the pneumatic tire have a designated mounting direction with respect to a vehicle, and that both the terminals of the carcass layer be arranged on a vehicle inner side. Thus, the durability of both the terminals of the carcass layer can be improved.

In the present technology, it is preferred that the cord angle in the belt layer with respect to the tire circumferential direction fall within a range from 15° to 45°. Thus, the belt layer can be caused to have the hoop function required as the belt layer.

In the present technology, it is preferred that an intermediate rubber layer having a thickness from 0.2 mm to 2.0 mm be arranged between the carcass layer and the belt layer. Thus, degradation in out-of-plane flexural rigidity of the tread region can be complemented, and plane flexural rigidity of the tread region can be improved.

In the present technology, it is preferred that a belt reinforcing layer be provided outward in the tire radial direction of the belt layer. Thus, high-speed durability can be improved.

In the present technology, a ground contact region of the tread portion is specified based on a tread ground contact width in a tire axial direction, which is measured when the tire is mounted on a regular rim, is inflated to a regular internal pressure, and is placed vertically upon a flat surface with a regular load applied thereto. Ground contact edges are outer most positions of the ground contact region in the tire axial direction. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (Tire and Rim Association, Inc.), and refers to a "measuring rim" in the case of ETRTO (European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by standards for each tire according to a system of standards that includes standards on which tires are based, and refers to "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. When the tire is for use with a passenger vehicle, a load corresponding to 88% of the load described above is used.

DETAILED DESCRIPTION

Figure 1:
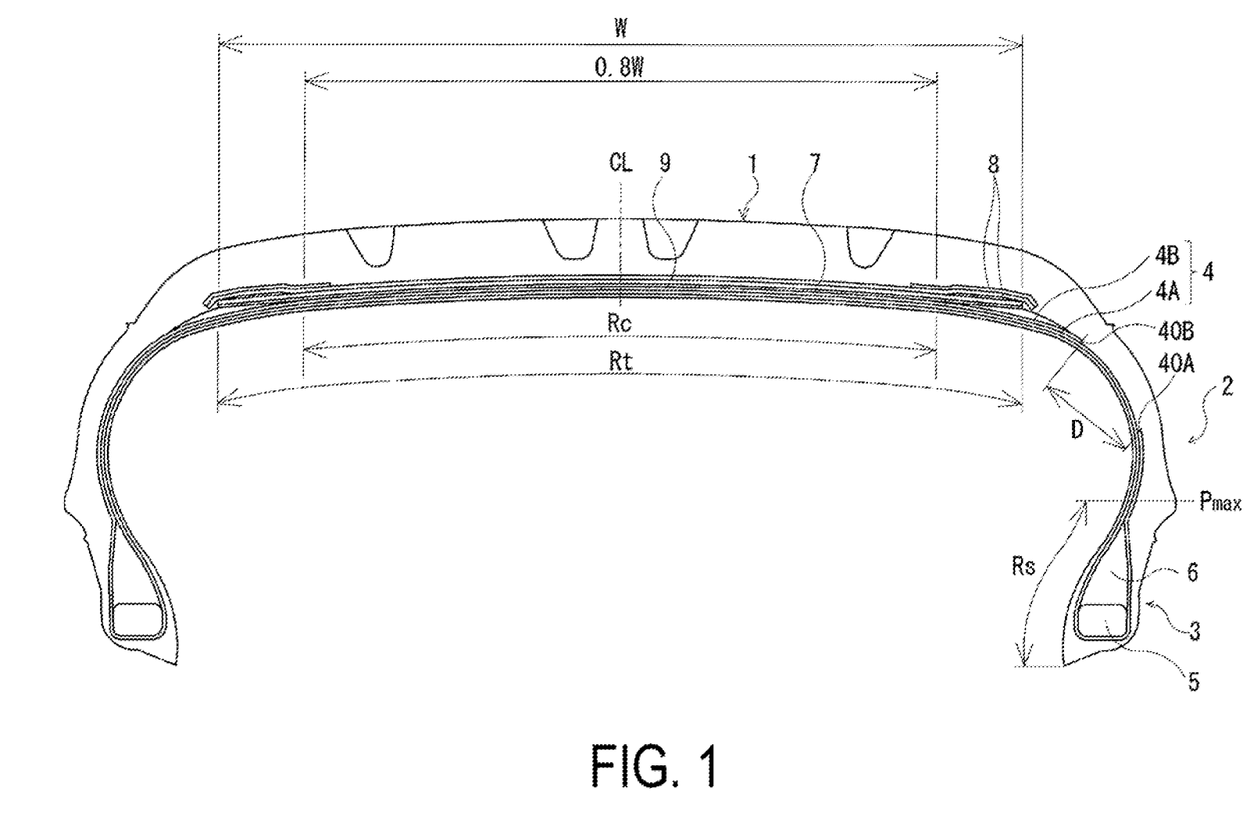
FIG. 1 is a meridian cross-sectional view illustrating a pneumatic tire according to an embodiment of the present technology.
Figure 2:
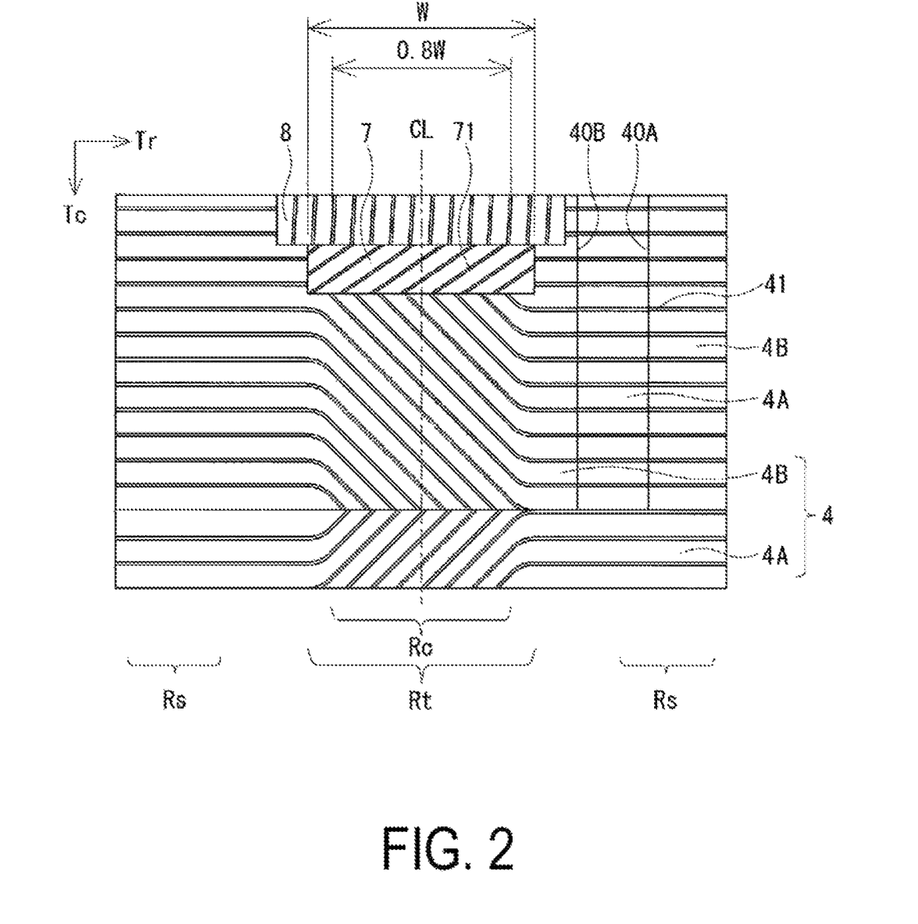
FIG. 2 is a plan view in which a carcass layer, a belt layer, and a belt reinforcing layer of the pneumatic tire according to the embodiment of the present technology are extracted and illustrated.

Now, with reference to the accompanying drawings, detailed description is made of the configuration of the present technology. FIG. 1 and FIG. 2 are illustrations of a pneumatic tire according to an embodiment of the present technology. Note that, the line CL indicates a tire center line in FIG. 1 and FIG. 2.

As illustrated in FIG. 1, the pneumatic tire of the present embodiment includes a tread portion 1 extending in a tire circumferential direction to have an annular shape, a pair of sidewall portions 2 and 2 arranged on both sides of the tread portion 1, and a pair of bead portions 3 and 3 arranged inward of the sidewall portions 2 in a tire radial direction.

A single carcass layer 4 is mounted between the pair of bead portions 3 and 3. The carcass layer 4 includes a plurality of carcass cords 41 extending in the tire radial direction, and is folded back around bead cores 5 arranged in each of the bead portions 3 from a tire inner side to a tire outer side. A bead filler 6, which has a triangular cross-sectional shape and is formed from rubber composition, is arranged on the outer circumference of the bead core 5.

In this case, a tread region Rt indicates a region corresponding to a ground contact width W of the tread portion 1. A side region Rs indicates at least a region inward in the tire radial direction from a tire maximum width position $P_{max}$. A tread central region Rc indicates a region corresponding to 80% of a center of the ground contact width W of the tread portion 1. The carcass layer 4 includes an inner layer 4A arranged inward in the tire radial direction in the tread region Rt and an outer layer 4B arranged outward in the tire radial direction in the tread region Rt, and has a double layer structure in the tread region Rt.

A belt layer 7 having a single layer is embedded on an outer circumferential side of the carcass layer 4 in the tread portion 1. When the belt layer 7 has a single layer as described above, an increase in mass of the belt layer 7 can be suppressed to a minimum extent, and a hoop effect of the tread portion 1 can be increased. The belt layer 7 includes a plurality of belt cords 71 that are inclined with respect to the tire circumferential direction. As the belt cords 71 of the belt layer 7, steel cords or organic fiber cords of nylon, aramid, or the like are preferably used.

For the purpose of improving high-speed durability, a belt reinforcing layer 8 is arranged on an outer circumferential side of the belt layer 7. The belt reinforcing layer 8 has a plurality of (two in FIG. 1) layers in which fiber cords are oriented in the tire circumferential direction. The belt reinforcing layer 8 may have, for example, a jointless structure in which a strip material formed by aligning at least one rubber-coated fiber cord is spirally wound in the tire circumferential direction. A cord angle of the belt reinforcing layer 8 with respect to the tire circumferential direction is 5° or less and more preferably 3° or less. As the fiber cord of the belt reinforcing layer 8, there are suitably used an organic fiber cord of, for example, polyethylene terephthalate (PET), polyethylene naphthalate (PEN), nylon, rayon, or aramid, an aramid fiber cord with high elasticity, or a composite cord in which an aramid fiber with high elasticity and a nylon fiber with low elasticity are intertwined. Note that, in the mode in FIG. 1, a portion of the belt reinforcing layer 8, which is positioned inward in the tire radial direction, forms a full cover for covering the entire width of the belt layer 7, and portions of the belt reinforcing layer 8, which are positioned outward in the tire radial direction, form edge cover layers for covering only edges of the belt layer 7.

Further, an intermediate rubber layer 9 is arranged between the carcass layer 4 and the belt layer 7. It is preferred that the intermediate rubber layer 9 have a modulus of 10 MPa or greater and a dissipation factor (tan δ) of 0.2 or less at 60° C. Further, short fibers may be blended in a rubber sheet forming the intermediate rubber layer 9, but long fibers are excluded. A thickness of the intermediate rubber layer 9 may be formed to fall within a range from 0.2 mm to 2.0 mm. When the thickness of the intermediate rubber layer 9 is appropriately set as described above, degradation in out-of-plane flexural rigidity of the tread region Rt can be complemented, and plane flexural rigidity of the tread region Rt can be improved.

FIG. 2 is a view in which the carcass layer 4, the belt layer 7, and the belt reinforcing layer 8 of the pneumatic tire according to the embodiment of the present technology are extracted and illustrated. The tire radial direction is denoted by Tr, and the tire circumferential direction is denoted by Tc. As illustrated in FIG. 2, the carcass cords 41 forming the carcass layer 4 are inclined with respect to the tire radial direction, that is, a tire width direction in the tread region Rt, and at the same time, are arranged to extend along the tire radial direction in the side region Rs. In the mode in FIG. 2, the carcass cords 41 in both the inner layer 4A and the outer layer 4B are inclined with respect to the tire width direction in the tread region Rt. However, the following structure may be employed. That is, the carcass cords 41 in one of the inner layer 4A and the outer layer 4B are inclined with respect to the tire width direction in the tread region Rt, and the carcass cords 41 in the other of the inner layer 4A and the outer layer 4B are arranged to extend along the tire radial direction in the tread region Rt and the side region Rs. That is, the present technology has the structure in which the carcass cords 41 in at least one layer of the inner layer 4A and the outer layer 4B are arranged to be inclined with respect to the tire width direction in the tread region Rt.

Meanwhile, the belt cords 71 forming the belt layer 7 are inclined in the same direction with respect to the tire radial direction in the tread region Rt. In the mode in FIG. 2, the carcass cords 41 in the outer layer 4B and the belt cords 71 cross with each other. The present technology has the structure in which, in the tread region Rt, the carcass cords 41 in at least one layer of the inner layer 4A and the outer layer 4B and the belt cords 71 are arranged to cross with each other.

Figure 3:
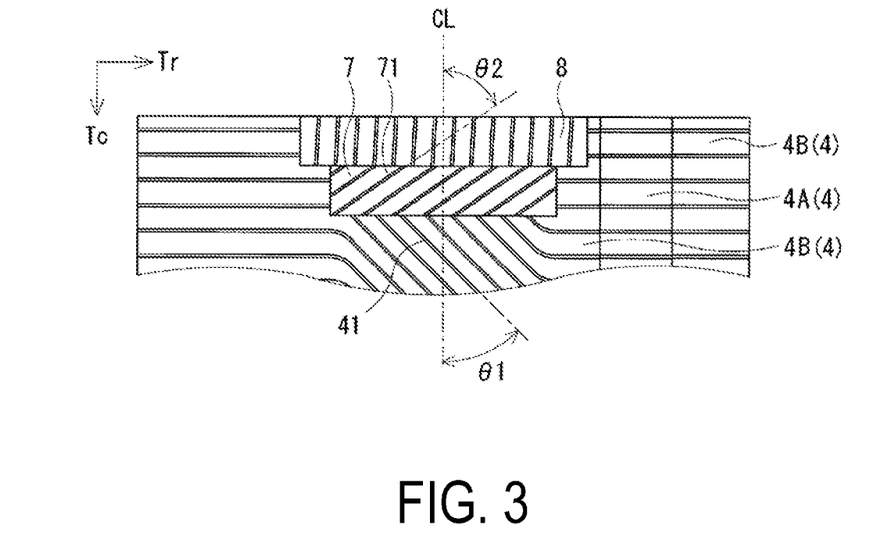
FIG. 3 is a plan view partially illustrating the carcass layer, the belt layer, and the belt reinforcing layer in FIG. 2 for the purpose of defining cord angles of carcass cords and belt cords.

As illustrated in FIG. 3, an angle of the carcass cords 41 in the carcass layer 4 with respect to the tire circumferential direction is indicated as a cord angle θ1. The cord angle θ1 indicates an average angle in each of the tread central region Rc and the side region Rs. In this case, as for the cord angle θ1 in the carcass layer 4 in the tread central region Rc, the cord angle θ1 in at least one layer of the inner layer 4A and the outer layer 4B is set different from the cord angle θ1 in the side region Rs. Further, in the mode in FIG. 2, there is exemplified the case where the cord angle θ1 in the inner layer 4A and the cord angle θ1 in the outer layer 4B are different from each other in the tread central region Rc, and where the carcass cords 41 in the inner layer 4A and the carcass cords 41 in the outer layer 4B are arranged to be orthogonal with each other in the tread central region Rc. However, in a case where the belt layer 7 is provided, the carcass cords 41 may be arranged to have the same cord angle θ1 in the inner layer 4A and the outer layer 4B in the tread central region Rc.

Figure 4A:
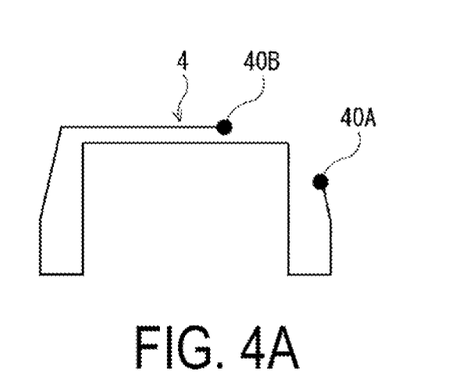
FIG. 4A is an explanatory diagram schematically illustrating positions of both ends of the carcass layer in FIG. 1, and FIG. 4B and FIG. 4C are explanatory views illustrating modified examples.

FIG. 4A is a view for schematically illustrating positions of both terminals 40A and 40B of the carcass layer 4 in FIG. 1. The terminal 40A illustrated in FIG. 4A extends to a vicinity of a sidewall portion 2, and the other terminal 40B extends to the ground contact edge of the tread portion 1 positioned on an opposite side with respect to the tire center line CL as a reference. In the mode in FIG. 4A, both the terminals 40A and 40B of the carcass layer 4 are separated from each other without being overlapped with each other. However, both the terminals 40A and 40B of the carcass layer 4 may be overlapped with each other (structure described later in FIG. 4C). In any case of the structures, a separation distance D illustrated in FIG. 1, which is a direct distance between the terminals 40A and 40B of the carcass layer 4, is set to 5 mm or larger. Accordingly, the terminal 40A and 40B of the carcass layer 4 is suitably improved in durability.

Figure 4B:
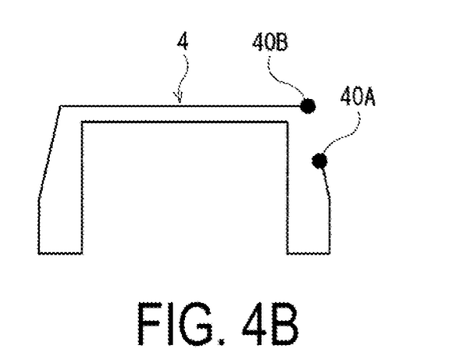
Figure 4C:
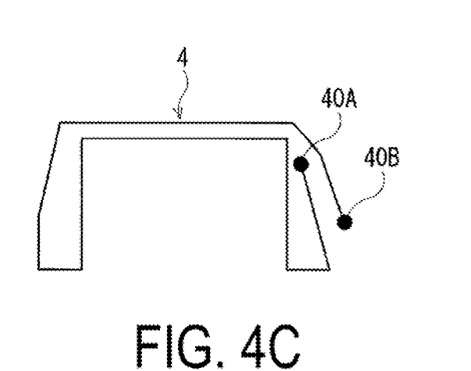

FIG. 4B and FIG. 4C are modified examples of FIG. 4A. In any case in FIG. 4B and FIG. 4C, the terminal 40A extends to the vicinity of the sidewall portion 2. Meanwhile, the terminal 40B in FIG. 4B extends beyond the ground contact edge of the tread portion 1 positioned on the opposite side with respect to the tire center line CL as the reference, and extends to a part near a shoulder portion of the tread portion 1. Further, the terminal 40B illustrated in FIG. 4C extends to a vicinity of a bead filler 6 positioned on the opposite side with respect to the tire center line CL as the reference.

Figure 5:
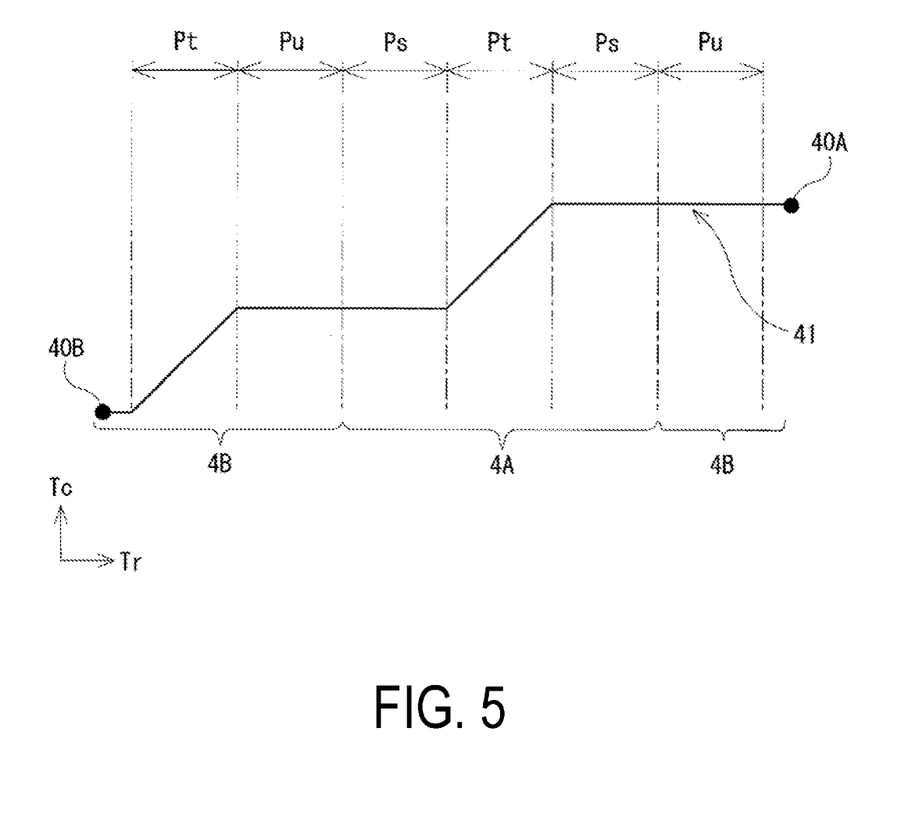
FIG. 5 is an explanatory diagram schematically illustrating an angle change of the carcass cords in each portion of the carcass layer in FIG. 1.

FIG. 5 is a view for schematically illustrating an angle change of the carcass cords 41 in each portion of the carcass layer 4 in FIG. 1. That is, FIG. 5 is a view for continuously illustrating the change of the cord angle θ1 of the carcass cords 41 forming the carcass layer 4 between the one terminal 40A and the other terminal 40B when the entire single carcass layer 4 is viewed as one member in plan view. Based on FIG. 5, when the carcass cords 41 are parallel with the tire radial direction, the cord angle θ1 is 90°, and when the carcass cords 41 are inclined, the cord angle θ1 is other than 90° (45° in FIG. 5). The carcass layer 4 mainly includes three portions, which are a turn-up portion Pu, a side portion Ps, and a tread portion Pt. As illustrated in FIG. 5, in the tread portion Pt, the cord angle θ1 is 45°. In the turn-up portion Pu and the side portion Ps, the cord angle θ1 is 90°. On the tire, the carcass layer 4 is folded back, and the carcass cords 41 in the inner layer 4A and the outer layer 4B are arranged to cross with each other as illustrated in FIG. 2.

In the above-described pneumatic tire, the following structure is provided. That is, the one terminal of the carcass layer 4 extends to the ground contact edge of the tread portion 1 positioned on the opposite side with respect to the tire center line CL as the reference. The carcass layer 4 has a double layer structure including the inner layer 4A and the outer layer 4B. The inner layer 4A is positioned inward in the tire radial direction in the tread region Rt. The outer layer 4B is positioned outward in the tire radial direction of the inner layer 4A in the tread region Rt. The cord angle θ1 in the carcass layer 4 in the tread central region Rc with respect to the tire circumferential direction is different from the cord angle θ1 in at least one layer of the inner layer 4A and the outer layer 4B of the carcass layer 4 in the side region Rs with respect to the tire circumferential direction. With this structure, rigidity different for each of the tread region Rt and the side region Rs can be achieved, and the rigidity desired for each of the tread region Rt and the side region Rs can be secured. Further, as compared to the related-art pneumatic tire including the plurality of belt layers, the tire can be reduced in weight. Further, as compared to the pneumatic tire including the carcass layers, which are not single but have two or more layers, portions which do not substantially function as reinforcing materials can be reduced, and hence the space between the bead portions 3 can be reinforced with the minimum number of members.

Particularly, it is preferred that the cord angle θ1 in the carcass layer 4 in the tread central region Rc with respect to the tire circumferential direction be smaller than the cord angle θ1 in at least one layer of the inner layer 4A and the outer layer 4B of the carcass layer 4 in the side region Rs with respect to the tire circumferential direction. As described above, when the cord angle θ1 in each of the tread central region Rc and the side region Rs is appropriately set, the carcass layer 4 can share the function as the belt layer.

Further, the cord angle θ1 is preferably set in the following manner. That is, the cord angle θ1 falls within a range from 10° to 75° in the tread central region Rc, is gradually increased as approaching outward in the tire width direction with respect to the edge of the belt layer 7, and falls within a range from 85° to 90° in the side region Rs. Particularly, in the tread central region Rc, the cord angle θ1 preferably falls within a range from 15° to 70° and more preferably a range from 15° to 65°. When the cord angle θ1 is appropriately set as described above, the carcass layer 4 can sufficiently share the function as the belt layer. Further, the carcass cords 41 are allowed to be gently changed in angle between the tread region Rt and the side region Rs, and hence the durability can be improved.

Further, as illustrated in FIG. 3, an angle of the belt cords 71 forming the belt layer 7 with respect to the tire circumferential direction is indicated as a cord angle θ2. The cord angle θ2 preferably falls within a range from 15° to 45°. When the cord angle θ2 is appropriately set as described above, the belt layer 7 can be caused to have the hoop function required as the belt layer.

In the present technology, a cord count per unit width, which is 50 mm, for the carcass cords 41 at least in the tread region Rt is preferably from twenty to seventy, and a diameter of the carcass cord 41 preferably falls within a range from 0.2 mm to 1.5 mm. When a dimension of the carcass cord 41 is appropriately set as described above, increase in mass of the carcass layer 4 is suppressed, which contributes to reduction in weight of the tire. At the same time, degradation in rigidity and durability can be suppressed.

Figure 6:
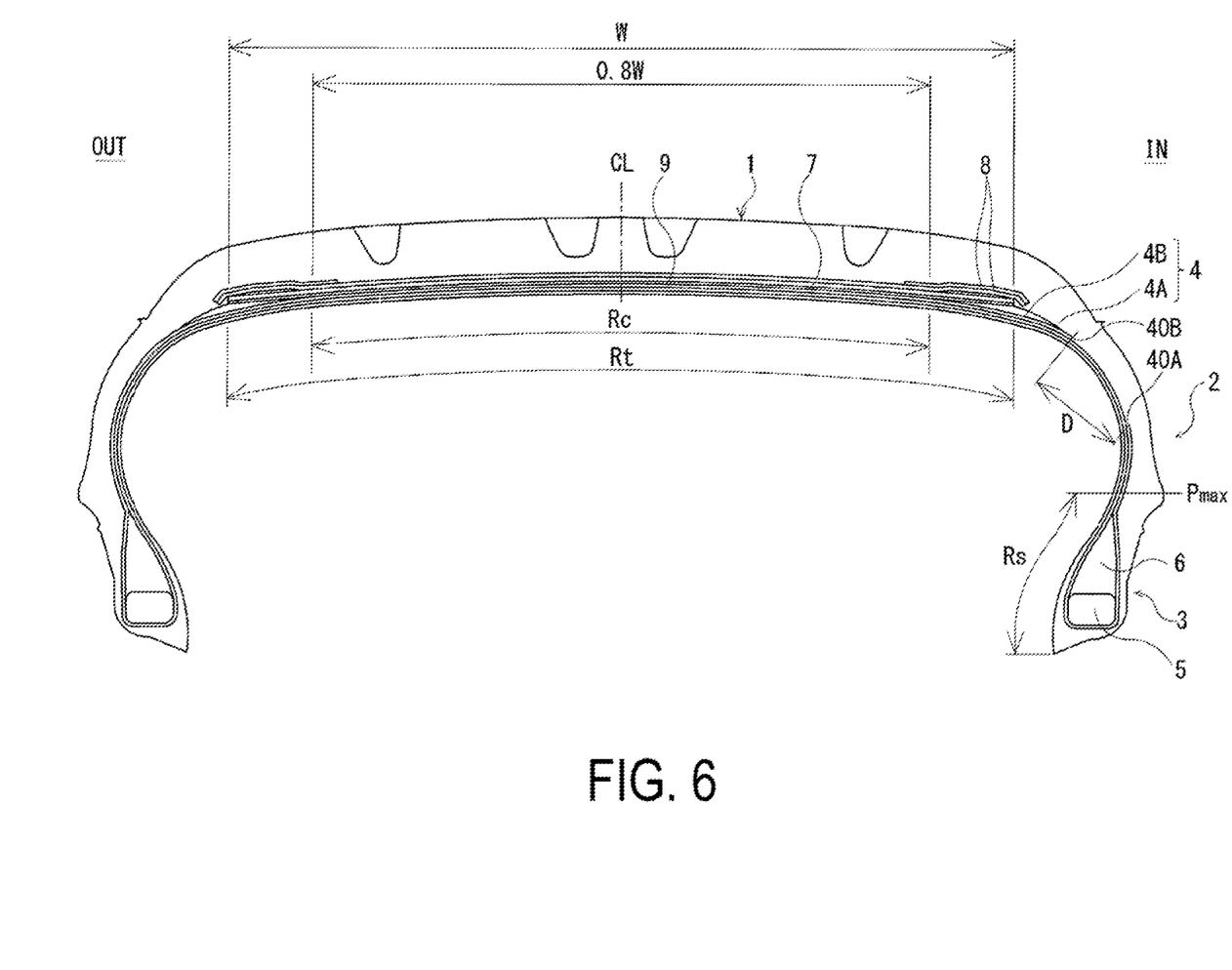
FIG. 6 is a meridian cross-sectional view illustrating a modified example of a pneumatic tire according to the embodiment of the present technology.

FIG. 6 is a view illustrating a modified example of the pneumatic tire according to the embodiment of the present technology. "IN" indicates an inner side of the tire center line CL with respect to a vehicle at the time when the tire is mounted to the vehicle (hereinafter referred to as "vehicle inner side"), and "OUT" indicates an outer side of the tire center line CL (hereinafter referred to as "vehicle outer side"). When the present technology is applied to a pneumatic tire for which a mounting direction with respect to the vehicle is designated, both the terminals 40A and 40B of the carcass layer 4 are preferably arranged on the vehicle inner side. When both the terminals 40A and 40B are arranged as described above, the durability of both the terminals 40A and 40B of the carcass layer 4 can be improved.

EXAMPLES

A tire for each of Examples 1 to 7 was manufactured in the following manner. The pneumatic tire had a tire size of 235/40R18, and included a tread portion, a pair of sidewall portions, a pair of bead portions, and a carcass layer. The tread portion extended in the tire circumferential direction, and had an annular shape. The pair of sidewall portions were arranged on both sides of the tread portion. The pair of bead portions were arranged inward in the tire radial direction of the sidewall portions. The pair of bead portions were arranged inward in the tire radial direction of the sidewall portions. The carcass layer included a plurality of carcass cords mounted between the pair of bead portions. The pneumatic tire had a structure in which the carcass layer were wound from the tire inner side to the outer side about the bead cores of the bead portions. The pneumatic tire also had the following structure. That is, one terminal of the carcass layer extended to a ground contact edge of the tread portion positioned on an opposite side with respect to a tire center line as a reference. The carcass layer had a double layer structure including an inner layer positioned inward in the tire radial direction in a tread region and an outer layer positioned outward in the tire radial direction in the tread region. A cord angle in the carcass layer in a tread central region with respect to the tire circumferential direction was different from a cord angle in at least one of the inner layer and the outer layer of the carcass layer in a side region with respect to the tire circumferential direction.

In each of Examples 1 to 7, as shown in Table 1, the cord angle in the inner layer in the tread central region, the cord angle in the inner layer in the side region, the cord angle in the outer layer in the tread central region, the cord angle in the outer layer in the side region, the cord angle in a belt layer, positions of both the terminals of the carcass layer, and presence or absence of an intermediate rubber layer were set. The respective cord angles were inclination angles with respect to the tire circumferential direction.

Note that, as for the presence or absence of the intermediate rubber layer, a rubber sheet having a thickness of 1 mm was used for the tire including the intermediate rubber layer in Example 7.

For the purpose of comparison, a tire of a conventional example, which included two carcass layers in which carcass cords were oriented in the tire radial direction and two belt layers, was prepared. In the conventional example, the inner belt layer and the outer belt layer had the cord angle of 24° and the cord angle of −24°, respectively.

The test tires were evaluated for tire weight, rolling resistance, and steering stability according to the following evaluation methods, and results are shown in Table 1.

Tire Weight

The weight of each test tire was measured. Evaluation results are expressed as index values with the value of the conventional example being defined as 100. Smaller index values indicate lower tire weight.

Rolling Resistance

Each test tire was assembled on a wheel having a rim size of 18×8.5 J, and was inflated to an air pressure of 230 kPa. Then, according to the ISO standard, the rolling resistance was measured through use of a drum test device having a drum diameter of 2000 mm. Evaluation results are expressed as index values with the value of the conventional example being defined as 100. Smaller index values indicate less rolling resistance.

Steering Stability

Each test tire was assembled on a wheel having a rim size of 18×8.5 J, and mounted to a vehicle having a displacement of 2400 cc. Then, under a condition of an air pressure of 230 kPa, sensory evaluations were performed by a test driver on steering stability. Evaluation results are expressed by a grading scale out of 10 with 5 as a reference point. Larger evaluation scores indicate superior steering stability.

opposite side with respect to the tire center line as the reference. The carcass layer had a double layer structure including the inner layer positioned inward in the tire radial direction in the tread region and the outer layer positioned outward in the tire radial direction in the tread region. The cord angle in the carcass layer in the tread central region with respect to the tire circumferential direction was different from the cord angle in the carcass layer in the side region with respect to the tire circumferential direction. With this structure, as apparent from Table 1, the tires in Examples 1 to 7 maintain the steering stability equivalent to that in the conventional example, and at the same time, the tire weight is reduced. Further, the rolling resistance is improved.

The invention claimed is:

1. A pneumatic tire, comprising:
   a tread portion extending in a tire circumferential direction and having an annular shape; a pair of sidewall portions arranged on both sides of the tread portion;
   a pair of bead portions arranged inward in a tire radial direction of the pair of sidewall portions; and
   a carcass layer including a plurality of carcass cords, which are mounted between the pair of bead portions, the carcass layer being wound from a tire inner side to an outer side about bead cores of the pair of bead portions, wherein
   the pneumatic tire has a first side and a second side with a tire center line as a boundary, the carcass layer has a first terminal wound around a bead core on the first side and a second terminal wound around a bead core on the second side, the first terminal extends to a ground contact edge of the tread portion positioned on the second side, and the second terminal terminates at the sidewall portion on the second side,
   when a tread region indicates a region corresponding to a ground contact width of the tread portion, a tread

TABLE 1

| | Conventional Example | Example 1 | Example 2 | Example 3 | Example 4 | Example 5 | Example 6 | Example 7 |
|---|---|---|---|---|---|---|---|---|
| Cord angle in inner layer in tread central region | 90° | 60° | −60° | −60° | −45° | −45° | −60° | −45° |
| Cord angle in inner layer in side region | 90° | 90° | 90° | 90° | 90° | 90° | 90° | 90° |
| Cord angle in outer layer in tread central region | 90° | −60° | −60° | 60° | −45° | 45° | −60° | 45° |
| Cord angle in outer layer in side region | 90° | 90° | 90° | 90° | 90° | 90° | 90° | 90° |
| Cord angle in belt layer | 24°/−24° | 24°/−24° | 24° | 24° | 24° | 24° | 24° | 24° |
| Positions of terminals of carcass layer | — | FIG. 4A | FIG. 4A | FIG. 4A | FIG. 4B | FIG. 4C | FIG. 4C | FIG. 4C |
| Present or absence of intermediate rubber layer | — | Absent | Absent | Absent | Absent | Absent | Absent | Present |
| Tire Weight | 100 | 97 | 91 | 91 | 92 | 93 | 93 | 94 |
| Rolling Resistance | 100 | 100 | 95 | 95 | 93 | 93 | 94 | 94 |
| Steering stability | 5 | 6 | 5 | 5 | 6 | 6 | 5 | 6 |

The one terminal of the carcass layer extended to the ground contact edge of the tread portion positioned on the central region indicates a region corresponding to 80% of a center of the ground contact width of the tread portion, and a side region indicates a region inward in the tire radial direction with respect to a tire maximum width position, the carcass layer has a double layer structure including an inner layer positioned inward in the tire radial direction in the tread region and an outer layer positioned outward in the tire radial direction of the inner layer in the tread region, and a cord angle in the carcass layer in the tread central region with respect to the tire circumferential direction is different from a cord angle in at least one of the inner layer or the outer layer of the carcass layer in the side region with respect to the tire circumferential direction.

2. The pneumatic tire according to claim 1, wherein a separation distance between the first terminal and the second terminal of the carcass layer is set to 5 mm or larger.

3. The pneumatic tire according to claim 2, wherein the cord angle in the carcass layer in the tread central region with respect to the tire circumferential direction is smaller than the cord angle in at least one of the inner layer or the outer layer of the carcass layer in the side region with respect to the tire circumferential direction.

4. The pneumatic tire according to claim 3, wherein
the cord angle in at least one of the inner layer or the outer layer of the carcass layer with respect to the tire circumferential direction falls within a range from 10° to 75° in the tread central region, and
the cord angle in the carcass layer with respect to the tire circumferential direction falls within a range from 85° to 90° in the side region.

5. The pneumatic tire according to claim 4, wherein
a cord count per unit width, which is 50 mm, for the plurality of carcass cords forming the carcass layer at least in the tread region is from twenty to seventy, and
a diameter of each of the plurality of carcass cords falls within a range from 0.2 mm to 1.5 mm.

6. The pneumatic tire according to claim 5, further comprising a belt layer on an outer circumferential side of the carcass layer in the tread region.

7. The pneumatic tire according to claim 6, wherein the belt layer is a single layer.

8. The pneumatic tire according to claim 7, wherein
the pneumatic tire has a designated mounting direction with respect to a vehicle, and
the first terminal and the second terminal of the carcass layer are arranged on a vehicle inner side.

9. The pneumatic tire according to claim 8, wherein a cord angle in the belt layer with respect to the tire circumferential direction falls within a range from 15° to 45°.

10. The pneumatic tire according to claim 9, further comprising an intermediate rubber layer, which has a thickness of from 0.2 mm to 2.0 mm and is arranged between the carcass layer and the belt layer.

11. The pneumatic tire according to claim 10, further comprising a belt reinforcing layer provided outward in the tire radial direction of the belt layer.

12. The pneumatic tire according to claim 1, wherein the cord angle in the carcass layer in the tread central region with respect to the tire circumferential direction is smaller than the cord angle in at least one of the inner layer or the outer layer of the carcass layer in the side region with respect to the tire circumferential direction.

13. The pneumatic tire according to claim 1, wherein
the cord angle in at least one of the inner layer or the outer layer of the carcass layer with respect to the tire circumferential direction falls within a range from 10° to 75° in the tread central region, and
the cord angle in the carcass layer with respect to the tire circumferential direction falls within a range from 85° to 90° in the side region.

14. The pneumatic tire according to claim 1, wherein
a cord count per unit width, which is 50 mm, for the plurality of carcass cords forming the carcass layer at least in the tread region is from twenty to seventy, and
a diameter of each of the plurality of carcass cords falls within a range from 0.2 mm to 1.5 mm.

15. The pneumatic tire according to claim 1, further comprising a belt layer on an outer circumferential side of the carcass layer in the tread region.

16. The pneumatic tire according to claim 15, wherein the belt layer is a single layer.

17. The pneumatic tire according to claim 15, wherein a cord angle in the belt layer with respect to the tire circumferential direction falls within a range from 15° to 45°.

18. The pneumatic tire according to claim 15, further comprising an intermediate rubber layer, which has a thickness of from 0.2 mm to 2.0 mm and is arranged between the carcass layer and the belt layer.

19. The pneumatic tire according to claim 15, further comprising a belt reinforcing layer provided outward in the tire radial direction of the belt layer.

20. The pneumatic tire according to claim 1, wherein
the pneumatic tire has a designated mounting direction with respect to a vehicle, and
the first terminal and the second terminal of the carcass layer are arranged on a vehicle inner side.

* * * * *